Figure 1:
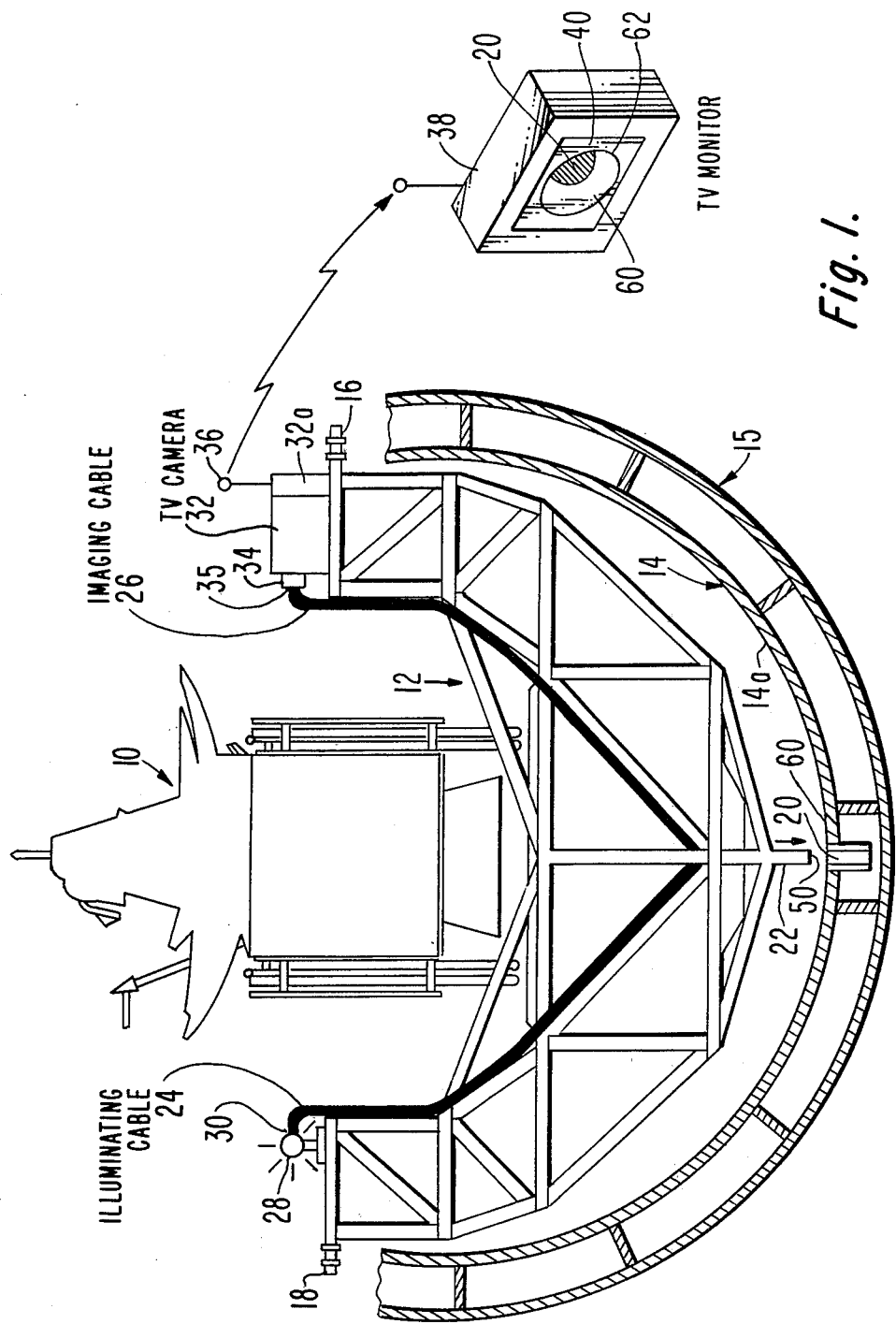

United States Patent [19]

Ganssle

[11] 4,395,005

[45] Jul. 26, 1983

[54] APPARATUS FOR REMOTELY INDICATING ALIGNMENT OF MALE AND FEMALE MEMBERS

[75] Inventor: Eugene R. Ganssle, Skillman, N.J.

[73] Assignee: RCA Corporation, New York, N.Y.

[21] Appl. No.: 133,250

[22] Filed: Mar. 24, 1980

[51] Int. Cl.³ .............................................. B64G 1/64
[52] U.S. Cl. .................... 244/161; 244/118.1; 244/137 R; 294/66 A; 350/96.25; 356/153; 358/901; 33/286; 29/464
[58] Field of Search ................... 244/137 R, 158, 161, 244/159, 160, 118.1; 356/153; 33/286, 228; 358/901; 330/96.23, 96.25, 96.26; 405/191; 166/341; 20/464, 407; 294/66 A, 19 R

[56] References Cited

U.S. PATENT DOCUMENTS

| | | | |
|---|---|---|---|
| 2,993,997 | 7/1961 | McFarlane | 356/153 |
| 3,136,208 | 6/1964 | Magson | 350/96.25 |
| 3,195,804 | 4/1980 | Hujsak | 244/161 |
| 3,224,709 | 12/1965 | Blizard | 244/1 |
| 3,285,533 | 11/1966 | Jernigan, Jr. | 244/1 |
| 3,453,385 | 7/1969 | Capellaro | 350/96.25 |
| 3,698,099 | 10/1972 | Matsura | 350/96.26 |
| 3,794,270 | 2/1974 | Wilkens | 244/1 |
| 3,814,081 | 6/1974 | Mori | 350/96.26 |
| 3,910,533 | 10/1975 | Cheatham et al. | 244/161 |
| 3,990,778 | 11/1976 | Magee et al. | 350/96.25 |
| 4,177,964 | 12/1979 | Hujsak et al. | 244/161 |
| 4,214,842 | 7/1980 | Franks | 294/66 A |
| 4,253,697 | 3/1981 | Acosta | 294/19 R |

OTHER PUBLICATIONS

Dart et al., "The Use of Fiber Optics to Study Objects on a Vibration Table", Journal of the SMPTE, 7/1970, vol. 79.

Wheelon, "The Impact of Space Shuttle on the Future of Com. Sat.", Nov. 9, 1978, p. 11.

Primary Examiner—Galen L. Barefoot
Attorney, Agent, or Firm—Joseph S. Tripoli; Robert L. Troike; William Squire

[57] ABSTRACT

A spacecraft support cradle structure includes a keel rod which depends from its lower extremity and which mates with a female receptacle in the base of a cargo bay of a launch vehicle. An illuminating cable and an imaging cable made of optical fibers coaxially mounted within the keel rod, terminate at the rod's lower extremity. The illumination cable transmits light to the lower extremity of the keel rod to illuminate the female receptacle. The illuminated region image as received by the imaging cable is picked up and displayed by a television system to aid the alignment of the keel rod with the receptacle.

3 Claims, 2 Drawing Figures

APPARATUS FOR REMOTELY INDICATING ALIGNMENT OF MALE AND FEMALE MEMBERS

The present invention relates to remotely guided docking and alignment systems.

Prior art docking and alignment systems, especially for spacecraft environments, utilize relatively complex alignment systems. For example, in one system a television camera is installed along the docking axis of one spacecraft and a three dimensional target screen is mounted along the docking axis of the other spacecraft. The television displays and associate electronics permit viewing the relative alignment of the two spacecrafts during docking. Other docking systems use visual aids such as electro-magnetic radiation employing both pulsed and CW radars. Light radars, infrared devices, and the like, have also been considered. Some systems also have based the alignment appartus on nuclear radiation. In the latter system, radioactive sources provide nuclear radiation beams for one spacecraft while radiation detectors sensitive to the radiation beams may be used on other spacecraft and the information fed to a computer. Still other systems use microwave radar apparatus. Generally, these systems have all in common complex circuitry and are required for relatively more difficult docking systems in space.

An apparatus for remotely indicating alignment of male and female members in accordance with an embodiment of the present invention comprises a first bundle of optical fibers having one end adjacent one of the members for illuminating the other of the members when the one member approaches engagement with the other. Illuminating means are adjacent the other end of the first bundle of fibers. The first bundle of fibers transmits illumination from the illuminating means to the one end. A second bundle of optical fibers has one end adjacent the end of one of the members in predetermined spaced relationship with the one member end for receiving a projected image of the other member reflected by the illumination from the first bundle means and transmits the projected image to the other end of the second bundle of optical fibers means. Imaging means at one end of the second bundle of optical fibers projects an image onto said second bundle means. Image receiving means at the other end of the second bundle of fibers receives and displays the transmitted illuminated projected image of the other member indicating its relative positions with respect to the one member.

Figure 2:
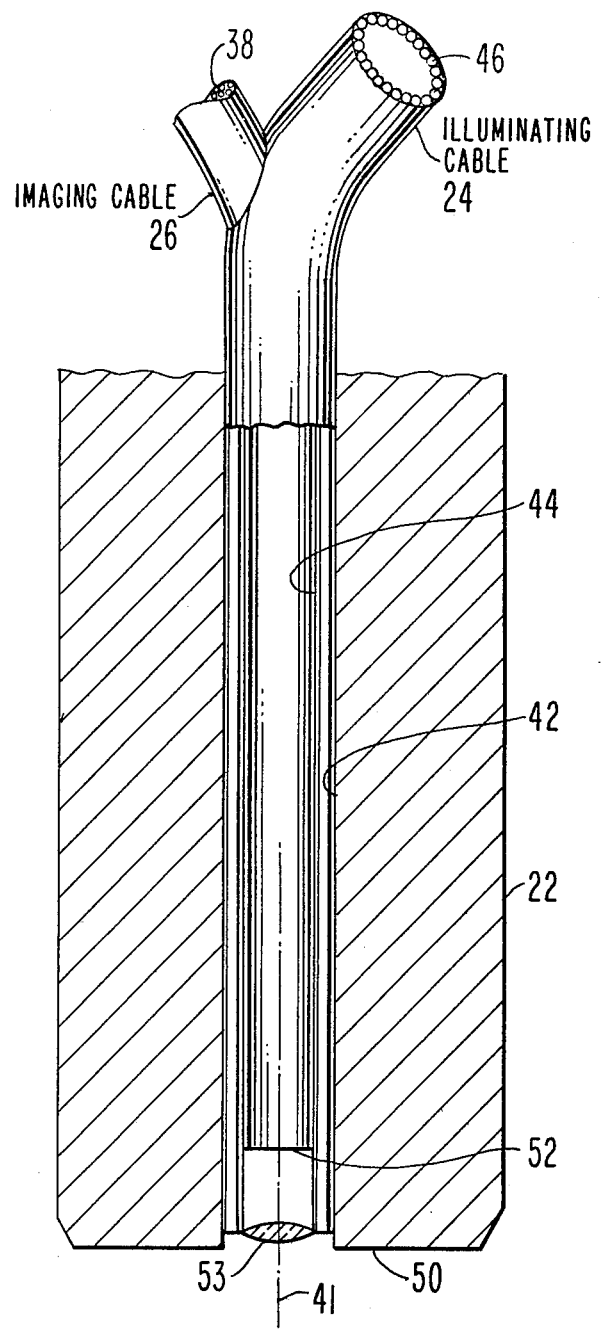

In the drawing:

FIG. 1 is an end elevation view partially in section of an apparatus embodying the present invention, and FIG. 2 is a sectional elevation view through the keel rod portion of the apparatus of FIG. 1.

In FIG. 1, the spacecraft 10, whose outline is shown for purpose of illustration and whose details are not necessary to the present invention, is releasably secured to a cradle 12. The cradle 12 is a truss network of beams and gusset plates and serves as a reusable structure for launching a number of different spacecrafts, such as spacecraft 10 in multiple launches. The cradle 12 is mounted within the cargo bay 14 of a launch vehicle 15 such as the space shuttle currently under development.

The cargo bay 14 is an elongated circular cylindrical structure somewhat like that of an aircraft which receives the cradle 12 nested therein. The cradle 12 is releasably secured in the cargo bay 14 and both elements, the cradle 12 and the space shuttle, are reusable structures. That is, when the space shuttle reaches a launch position in space the spacecraft 10 is launched from the cradle 12, the cradle 12 remaining within the cargo bay 14. The space shuttle then returns to earth for receiving a new spacecraft to be secured to the cradle 12 and to be subsequently launched by the shuttle.

The cargo bay 14 of the lanch vehicle 15 is designed to have trunnion supports (not shown) for receiving trunnions 16 and 18 mounted to the cradle 12. The trunnions 16 and 18 are horizontal rods which extend in a lateral direction from the cradle 12. The mounting surface 60 of the cargo bay is covered by light reflective plates at surface 60. Mounted at the base of the surface 60 of cargo bay 14 is a keel receiving female receptacle 20. This is, for example, a cylindrical hollow tube structure mounted within the cargo bay 14 and extending from surface 60. Secured to the base of the cradle 12 is a keel rod 22. Keel rod 22 is a cylindrical member which depends from the truss network of cradle 12 and is designed to mate within the receptacle 20. All cradles 12 to be mounted to and launched by a launch vehicle are required to have trunnions 16, 18 and keel rod 22.

The problem with such mounting is that the keel rod 22 is positioned in the lower extremity of the cradle 12 and makes it extremely difficult for an operator to visually align the rod 22 with the receptacle 20. Unless the two elements are accurately aligned, insertion could severely damage one or both of these elements. The apparatus of the present invention is provided to assure alignment during insertion of the rod 22 into receptacle 20.

This apparatus includes an illuminating cable 24 comprising a fiber optic bundle and an imaging cable 26 which also comprises a fiber optic bundle. Light source 28 is mounted to the cradle 12, for example, or to some other structure for providing illumination to one end 30 of the cable 24. The cable 24 is secured to the cradle and runs from the light source 28 to the inside of the keel rod 122. A television camera 32 is releasably mounted to the cradle 12 and has its lens and pick up elements 34 adjacent one end of the cable for receiving the light image transmitted by the cable 26.

The cable 26 is secured to the cradle and runs from camera 32, and terminates inside keel rod 22. A transmitter 32a coupled to the camera 32 transmits via antenna 36 a video signal to a television monitor 38 which picks up the video signals via its antenna and displays on a screen 40 the alignment information as shown in FIG. 1.

In FIG. 2, the termination of the imaging cable 26 and the illuminating cable 24 is shown in more detail. Imaging cable 26 comprises a bundle of fiber optic rods 38 laid parallel and side by side to form a solid circular cylinder of fiber optic rods. The cable 26 extends along the center axis 41 of keel rod 22 and through a hole 42 in the longitudinal center of the keel rod 122. The illuminating cable 24 is formed of a plurality of fiber optic rods 46 which are generally parallel to each other and arranged in an annular ring within the hole 42 of keel rod 22 to form an elongated circular or hollow cylinder or sleeve. The cable 24 extends through and coaxial with the cable 26. The imaging cable 26 and illuminating cable 24 terminate adjacent the extended end 50 of the rod 22. Illuminating cable 24 surrounds the imaging cable 26. The end 52 of the imaging cable 26 terminates within rod 22 a distance from end 50. A lens 53 secured to the end of cable 24 has its focal plane at the end plane of cable 26 at 52. Lens 53 projects the image of the receptacle 20 on to the cable 26. It is to be understood that the ends of the imaging cable 26 are terminated coherently, i.e., in one plane, so as to provide a uniform image.

In practice, the keel rod 22 may have a diameter of about three inches. If the hole 42 were made approximately 0.75 inches in diameter, it is estimated that the bending strength of the keel rod 22 would be reduced by the hole approximately 0.4% and its sheer strength by 6%. It may be possible that even a smaller hole 42 would be sufficient. The imaging cable 26 is centered in the hole 42 along axis 41.

The light 28 and the camera 32 are releasably secured to the cradle 12 for permitting the cradle 12 to be aligned in the cargo bay 14. After the cradle 12 is mounted within the cargo bay 14 with the keel rod 22 in receptacle 20 and the trunnions 16 and 18 securely in place, the camera 32 and the light source 28 are removed from the structure. Only the illuminating cable 24 and imaging cable 26 remain with the cradle 12.

With the light source 28 and camera 32 mounted to the cradle 12 a crane (not shown) coupled to the cradle lowers the cradle 12 into the cargo bay 14. Illuminating cable 24, FIG. 1, transmits light from the source 28 and illuminates the receptacle 20 area of the cargo bay 14 as the keel rod 22 approaches the receptacle 20. The imaging cable 26 receives the reflected image of this region projected by lens 53, transmits it to the TV camera 32 which then transmits the video signal thus generated to the TV monitor 38. The display 40 on the TV monitor shows the light region 60 which is the light reflected from the surface 60 of the cargo bay 14 floor surrounding the dark region representing unreflected light associated with the receptacle 20. The TV monitor 38 in FIG. 1 shows receptacle 20 (dark) misaligned with the circular image 62 (light) formed by the imaging cable 26 at end 35 adjacent pick up elements 34 of camera 32. In other words, the light image outline of the imaging cable 26 provides alignment guidance for the dark image of the receptacle 20 due to the predetermined, centered spaced relationship of cable 26 and the lens 53 on keel rod 22 with respect to axis 41 of rod 22. Thus, when the dark receptacle 20 image is centered within the light image 62 of cable 26 on the TV monitor, then the operator knows at that time that the rod 22 axis 41 which is also the optical axis for lens 53 is centered in alignment with receptacle 20. As a further aid for alignment, additional markings, such as cross hairs, may be added to the end 35 of the imaging cable adjacent the camera lens 34. Additional markings may be provided on the surface 60 of the cargo bay to also aid in the alignment procedure.

When the operator visually observes that the receptacle 20 image on the TV monitor is in alignment with the cable 26 image 62, then the operator at that time lowers the cradle 12 inserting the rod 22 into the receptacle 20.

What is claimed is:

1. In combination:
    a spacecraft cradle adapted to be mounted in the cargo bay of a spacecraft launch vehicle and including means for receiving a spacecraft thereto, a male keel member depending from and below said cradle,
    a female keel receiving means adapted to be secured to said launch vehicle cargo bay,
    illuminating fiber optic means attached to said keel member for illuminating said keel receiving means during insertion of said keel member therein, and
    image display means including fiber optic imaging means attached to said keel member for receiving and remotely displaying the image of said illuminated keel receiving means and its spaced relation to the keel member during said insertion at a location remote from said keel receiving means, said displayed image providing information sufficient to provide alignment guidance of the keel member to said keel receiving means during said insertion.

2. The combination of claim 1 wherein said illuminating means includes first optical fibers adjacent said keel member for illuminating the position of said keel member with respect to said keel receiving means, said image display means including second optical fibers within said first optical fibers for receiving the image reflected by illumination from said first optical fibers indicating the relative position of said keel receiving means with respct to said keel member.

3. In an apparatus for remotely indicating alignment of male and female members, the combination comprising:
    spacecraft receiving means for receiving and supporting a spacecraft and including one of said male and female members;
    support means adapted to be launched into space for upporting said receiving means during said launch including the other of said male and female members;
    a first bundle of optical fibers with one end thereof adjacent one of said members for illuminating the other of said members when the one member approaches engagement with the other member;
    illuminating means adjacent the other end of said first bundle of fibers and releasably secured to said first bundle, said first bundle of fibers transmitting illumination from said illuminating means to said one end;
    a second bundle of optical fibers; p1 imaging means for projecting an image onto said second bundle of fibers at one end thereof, said one end of said second bundle of fibers being adjacent the end of one of said members in predetermined spaced relationship with the one member end for receiving the projected image of the other member reflected by the illumination from said first bundle of fibers and transmitting said received projected image to the other end of said second bundle of fibers; and
    image receiving means at said other end of said second bundle of fibers releasably secured to said second bundle for receiving and displaying the transmitted projected image of said other member and its spaced relationship with said one member, said projected image providing information sufficient to provide alignment guidance of the female member with the male member, whereby said illuminating means and said image receiving means can be removed from said apparatus prior to said launch.

* * * * *

UNITED STATES PATENT AND TRADEMARK OFFICE
CERTIFICATE OF CORRECTION

PATENT NO. : 4,395,005

DATED : July 26, 1983

INVENTOR(S) : Eugene R. Ganssle

It is certified that error appears in the above-identified patent and that said Letters Patent is hereby corrected as shown below:

Column 2, line 7, "lanch" should be --launch--.

Column 2, line 38, "122" should be --22--.

Column 4, line 23, "respct" should be --respect--.

Column 4, line 31, "upporting" should be --supporting--.

Column 4, line 43, delete "pl", and "imaging means" should be a new paragraph.

Signed and Sealed this

Thirteenth Day of September 1983

[SEAL]

Attest:

GERALD J. MOSSINGHOFF

Attesting Officer     Commissioner of Patents and Trademarks